United States Patent [19]

Gibbon

[11] Patent Number: 5,693,689
[45] Date of Patent: *Dec. 2, 1997

[54] MONITOR PUTTY WITH INCREASING STIFFNESS

[75] Inventor: Robert M. Gibbon, Fort Worth, Tex.

[73] Assignee: JMK International, Inc., Fort Worth, Tex.

[*] Notice: The term of this patent shall not extend beyond the expiration date of Pat. No. 5,446,075.

[21] Appl. No.: 475,032

[22] Filed: Jun. 7, 1995

Related U.S. Application Data

[63] Continuation-in-part of Ser. No. 376,629, Jan. 23, 1995, Pat. No. 5,446,075, which is a continuation of Ser. No. 111,689, Aug. 25, 1993, abandoned, which is a continuation-in-part of Ser. No. 41,081, Apr. 1, 1993, abandoned.

[51] Int. Cl.$^6$ ............................................. G21F 1/10
[52] U.S. Cl. ................... 523/137; 524/857; 524/588; 528/10; 528/32; 528/42
[58] Field of Search ...................... 523/137; 524/857, 524/588; 528/10, 32, 42

[56] References Cited

U.S. PATENT DOCUMENTS

| | | | |
|---|---|---|---|
| 2,541,851 | 2/1951 | Wright | 260/37 |
| 2,644,805 | 7/1953 | Martin | 260/46.5 |
| 2,852,484 | 9/1958 | New | 260/33.4 |
| 3,677,997 | 7/1972 | Kaiser et al. | 260/332 SB |
| 3,855,171 | 12/1974 | Wegehaupt et al. | 528/10 |
| 3,862,919 | 1/1975 | Nitzsche et al. | 528/18 |
| 4,011,197 | 3/1977 | Lee | 260/46.5 B |
| 4,026,844 | 5/1977 | Kittle et al. | 260/2.5 S |
| 4,208,316 | 6/1980 | Nauroth et al. | 260/37 SB |
| 4,273,589 | 6/1981 | Nauroth et al. | 106/308 Q |
| 4,308,074 | 12/1981 | Nauroth et al. | 106/309 |
| 4,463,108 | 7/1984 | Wagner et al. | 523/216 |
| 5,028,653 | 7/1991 | Desmonceau et al. | 524/462 |
| 5,039,771 | 8/1991 | Morimoto et al. | 528/14 |
| 5,094,238 | 3/1992 | Gibbon | 128/403 |
| 5,319,021 | 6/1994 | Christy | 524/857 |
| 5,446,075 | 8/1995 | Gibbon | 523/137 |

*Primary Examiner*—Karen A. Dean
*Attorney, Agent, or Firm*—Jefferson Perkins

[57] ABSTRACT

An exercise putty kit for providing manipulative physical therapy of increasing difficulty comprises a container (12) of a large mass (14) of borosiloxane putty and a package (16) of borosiloxane or siloxane putty. At least one small mass (18-32) is provided to the patient along with the large mass (14), the small mass and large mass being manipulated by the patient until a uniform color and stiffness are achieved in the combined mass (38). Preferably, a plurality of small masses (18-32) having a variety of colors are available for successive manipulation with the combined mass (38). The kit provides a means by which the difficulty of manipulative physical therapy may be monitored and increased. As more small masses (18-32) are added to the combined mass (38), the stiffness increases, requiring more manipulation to fully blend the masses.

36 Claims, 1 Drawing Sheet

MONITOR PUTTY WITH INCREASING STIFFNESS

RELATED APPLICATION

This application is a continuation-in-part of application Ser. No. 08/376,629 filed Jan. 23, 1995, now U.S. Pat. No. 5,446,075, which in turn is a continuation of application Ser. No. 08/111,689 filed Aug. 25, 1993, now abandoned, which in turn is a continuation-in-part of application Ser. No. 08/041,081 filed Apr. 1, 1993, now abandoned, all of which applications are assigned to JMK International, Inc., the assignee hereof, and all of which are fully incorporated by reference herein.

TECHNICAL FIELD OF THE INVENTION

The present invention relates in general to therapeutic exercise putties and more particularly to a method and exercise putty kit for increasing the level of difficulty in manipulative therapy using the exercise putty.

BACKGROUND OF THE INVENTION

Borosiloxanes are a class of compounds which are chain-extending reaction products of polysiloxanes and boron containing compounds such as trimethyl boroxane, pyroboric acid, boric anhydride, ethyl borate, esters of boric acid and others. Their formulation is well known, and is described in U.S. Pat. No. 2,541,851. Borosiloxanes have the peculiar property of exhibiting a resistance to deforming force which is proportional to the force applied to them, giving them the term "bouncing putties." The property also makes them useful as a constituent of exercise putty for use in physical therapy, where enhanced flexibility, dexterity and/or strength of the hands is desired.

In addition to there being no easy way for physical therapists to monitor the progress of patients with such exercise putties, addressed by color blending or dispersal in application Ser. No. 08/111,689, there is no easy way to increase the difficulty of the exercise without losing the ability to visually monitor progress. There is therefore a need for a method and exercise putty kit for increasing the difficulty of manipulative exercises without losing the ability to visually determine when the exercise is complete.

SUMMARY OF THE INVENTION

According to one aspect of the invention, a method of manipulative therapy is disclosed by which a first malleable mass having a first color and stiffness is supplied to a patient. A second malleable mass having a second color and stiffness different from that of the first mass is also supplied to the patient, and the patient is directed to knead or manipulate the two putties together. The putty is kneaded or manipulated until such time as the two masses are completely blended to yield a combined mass having a uniform color and stiffness which is intermediate the stiffnesses of the first and second masses. Preferably, the malleable masses provided to the patient are based on borosiloxane.

According to another aspect of the invention, a method of progressive manipulative therapy is disclosed by which the second malleable mass is significantly smaller and has a stiffness greater than that of the first malleable mass. Once this second malleable mass has been completely blended with the first mass to obtain a first combined mass, a third small mass with a stiffness greater than that of the first mass is supplied to the patient for manipulation with the product of the first combination, producing a second combined mass. The stiffness of the first combined mass is incrementally greater than that of the first mass. The stiffness of the second combined mass is incrementally greater than that of the first combined mass. The process can be repeated by adding further small masses. When using colors, the process will terminate when the color can no longer be altered by additions (final color is dark brown); from the standpoint of plasticity, the final mass is the stiffest. Where colors are used, the mass of putty will increase in stiffness as the highly colored putty additives are incorporated.

The present invention confers a technical advantage by gradually increasing the level of difficulty required to achieve a uniform blending of color. With each addition of a colored additive mass, the combined mass increases in stiffness making it more difficult to manipulate. The initial (e.g., white) putty has a lower value of plasticity and is less stiff than the color additive putties; therefore, when they are initially blended, the mass is of non-uniform stiffness. The blending/manipulating of color into the first mass is indicative of how much work the patient has done; the uniformity of color indicates that the mass has achieved uniform stiffness as well. With every addition of a new color, the level of difficulty increases because the stiffness increases. Therefore, a beneficial therapeutic method results in which a progressively more difficult set of exercises is presented, allowing patients to enhance manipulative strength over time.

Further aspects of the invention and their advantages will be discerned with reference to the following detailed description in conjunction with the drawings.

DETAILED DESCRIPTION OF THE INVENTION

Figure 1:
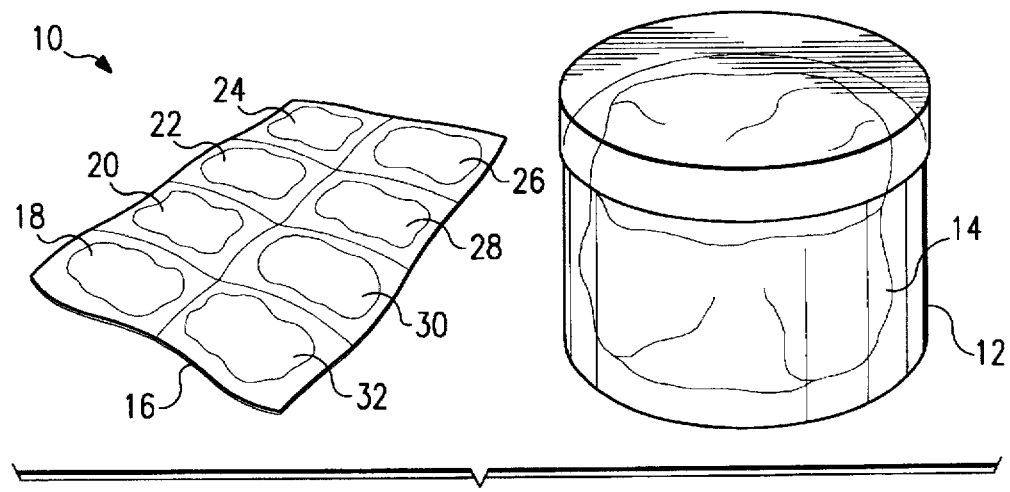
FIG. 1 is an isometric view of the principal components of an exercise putty kit for manipulative therapy.

Any of numerous malleable materials may provide the base for the colored exercise putties according to the invention, such as clays. However, siloxanes and siloxane reaction products are preferred because they will not dry out as water-based compositions have a tendency to do. A particularly preferred composition for the first or main exercise putty mass according to the present invention includes (a) a chain-extended polysiloxane reaction product, (b) optionally a second, normal uncured polysiloxane gum, (c) an internal lubricant such as a monounsaturated fatty acid, (d) any of a number of filler materials, and (e) in the instance of any of the originally colored masses of exercise putty described below, a small amount of pigment. The plasticity of such a main mass composition preferably ranges from 100 to $150 \times 10^{-2}$ mm.

The chain-extended polysiloxane reaction product is formed by reacting a polydiorganosiloxane with a reactant containing oxygen and either boron or tin. Such reactants can be any of several boron and oxygen containing reactants, such as trimethyl boroxane, pyroboric acid, boric anhydride, ethyl borate, esters of boric acid, etc. Where boron is selected as the chain-extending atom, trimethyl boroxine is a preferred reactant. The reactant may also be a tin- and oxygen-containing compound such as dibutyldiacetoxytin.

This reactant is reacted with a polydiorganosiloxane that preferably is a hydroxyl end-stopped polydimethylsiloxane fluid having a viscosity of 30 to 100,000 centistokes, more preferably having a viscosity of 50 to 70,000 centistokes, a weight average molecular weight of 3,000 to 103,000, and an average number of siloxyl units per molecule in the range of 40 to 1,400. The reactant attacks the hydroxyl groups on the ends of the polysiloxane chain to yield chain extension through the boron or tin groups. Where boron is used as the chain-extending atom, and because boron is trifunctional, the boron atom will link three polysiloxane chain ends together about fifty to one hundred percent of the time.

In a preferred composition, approximately 100 parts by weight of the above hydroxyl end-stopped polydimethylsiloxane are reacted with approximately 3 parts by weight of trimethyl boroxine. The reaction is carried out at approximately 200° F. to produce a borosiloxane reaction product.

The composition preferably further includes a normal uncured polysiloxane gum having a viscosity on the order of 1,000,000 centistokes and a plasticity between 120 and $140 \times 10^{-2}$ mm, inclusive, as measured on a Williams plastometer. This second polysiloxane may be any common polydiorganosiloxane gum. While a particularly preferred second polysiloxane is polydimethylsiloxane, the percentage of side group substitutions is largely irrelevant, as the end composition is not to be cured and little or no siloxyl crosslinking will occur. Thus, a methyl vinyl polysiloxane can as easily be used. This second polysiloxane may be trimethyl end-blocked, dimethyl vinyl end-blocked, or end blocked with other groups known in the art. The second uncured polysiloxane acts as a plasticizer to prevent the composition from becoming tacky after extensive kneading, and may be present in the composition in the range of 10 to 50 parts by weight inclusive relative to 100 parts by weight of the chain-extended polysiloxane reaction product.

Further, exercise putty which is based on nothing except borosiloxane is self-leveling and has a tendency to pool. This material cannot be left for long on carpeting or macroscopically porous surfaces as it will infiltrate the cracks and holes. Adding the second polysiloxane has the additional effect of providing some body or resistance to self-leveling, such that the resulting mass will be more shape-retaining or clay-like and less fluid-like.

The first or main putty mass also preferably includes an internal lubricant such as 9-octadecenoic acid, sold commercially under the trademark PAMOLYN 125 oleic acid by Hercules Incorporated of Wilmington, Del. Other monounsaturated fatty acids such as those of $C_{17}$–$C_{18}$ carbon chain length can be used. The monounsaturated fatty acid is added to affect the flow properties of the two blended polymers described above and may be present in the end composition at 0.2–2.0 parts by weight per 100 parts of the chain-extended polysiloxane reaction product.

A fourth principal constituent of the main mass is a filler such as a siliceous or calcareous material. Particular fillers useful for the invention include reinforcing fillers such as fumed silica and precipitated silica, and nonreinforcing fillers such as celite and ground quartz, and other fillers commonly known in the industry. The filler materials selected should not be so highly colored as to affect the desired color of the putty mass in question; on the other hand, at least with respect to the second, third, etc. colored masses described below, certain highly colored fillers such as iron oxide and titanium dioxide may be intentionally used in place of the pigments disclosed below to impart particular colors to the mass. The filler material can be present in the composition from 5 to 45 parts by weight relative to 100 parts of the reaction product.

In certain applications, it may be further desired to heat the exercise putty mass prior to giving it to the patient. Certain filler materials will heat up when subjected to microwave radiation. Filler materials which are compounds or complexes containing bound water, such as hydrated silicas, have this characteristic. Representative of such compounds and complexes is precipitated silica, which is also preferred because of its reinforcing capabilities. Precipitated silica has hydrated onto its surface a layer of water molecules. The water molecules themselves have OH bonds which absorb microwave energy; the silica particles are heated upon exposure to this energy. Hydrated silicates and other compounds containing bound water are preferred over other water-containing mixtures because bound-water particulate materials will heat up each time after successive exposures to microwave energy. Precipitated silica acquires its boundary layers of water by the process of its manufacture. Precipitated silica is also a preferred filler constituent in that it does not rub off on the hands as other fillers such as carbon black, metals and the various metal oxides have a tendency to do. This is because precipitated silica is wetted by the silicone gum and therefore is retained within the composition. Further, precipitated silica is preferred because it does not mask the color of pigments.

Other lubricants may be added to the composition in addition to, and not in place of, the monounsaturated fatty acid. One of these additional additives is petroleum, which has the particular effect of imparting an anti-sticking property to the composition. Petrolatum may be present in the composition in an amount in the range of 0 to 30 parts by weight relative to 100 parts by weight of the boro- or stannosiloxane reaction product. Glycerine may also be added in the range of 0 to 1 part by weight order to impart a shiny surface to the mass.

In order to form a particularly preferred composition, 100 parts by weight of a hydroxyl end-stopped polydimethylsiloxane having a viscosity of 70,000 centistokes is reacted with 3 parts by weight of trimethoxyboroxine at 200° F. until a "snow" of polymerized borosiloxane reaction product results. 100 parts of this reaction product is combined with 30 parts of uncured polydimethylsiloxane gum, having a plasticity of 130 mm, 1 part 9-octadecenyl acid, and 20 parts precipitated silica.

Each of the smaller masses to be successively added to the first or main mass has a silicone-based composition. Assuming a weight of the first or main mass of 100 grams, the weight of the smaller masses can range from 1 gram to 20 grams or higher. A 10 gram smaller mass weight is preferred.

In one embodiment, the smaller masses are high-plasticity versions of the main mass composition described above. The plasticity of such a smaller mass composition preferably should be above $200 \times 10^{-2}$ mm. According to this embodiment, the plasticity of the composition may be elevated by the incorporation of extra filler. The amount of extra filler added varies depending on the kind of filler used. Typically, relatively more filler of a nonreinforcing filler such as ground quartz should be used as compared to a reinforcing filler such as fumed silica. For example, an additional amount of fumed silica in a concentration ranging from about 2 to about 5 parts by weight relative to 100 parts of the reaction product can be added to the composition. Alternatively, an additional amount of ground quartz in a concentration ranging from about 10 to about 30 parts by weight relative to 100 parts of the reaction product can be added to the composition.

In a second embodiment, each of the smaller masses are formed of a high-plasticity, silicone-based composition without a borosiloxane or stannosiloxane reaction product. This composition is a mixture of a high molecular weight, uncured silicone polymer, a reinforcing filler and a process aid. The plasticity of such a smaller mass composition should be above $200 \times 10^{-2}$ mm and, preferably, range from 300 to $400 \times 10^{-2}$ mm. The high molecular weight silicone polymer can be any polydiorganosiloxane, such as polydimethylsiloxane or methyvinylpolysiloxane, with end groups selected from methyl, vinyl, hydroxyl, phenyl or other end groups known in the art and mixtures thereof. The molecular weight of the silicone polymer is preferably on the order of one million.

The reinforcing filler in this second embodiment can be fumed silica, precipitated silica or mixtures thereof, in concentrations of 25–60 parts by weight relative to 100 parts of the silicone polymer. Where fumed silica is used, it is preferred that the surface area be about 200 m²/g; where precipitated silica is used, the surface area should be about 150 m²/g, and relatively more should be used to obtain the same stiffening effect. A preferred fumed silica concentration is 39 parts by weight relative to 100 parts by weight of the silicone polymer.

The process aid in this smaller mass composition can be a relatively low molecular weight hydroxyl ended polysiloxane, on the order of 9 parts per 100 parts of the silicone polymer.

In a third embodiment, the smaller masses are composed of a mixture of the compositions of the first and second embodiments. The plasticity of such a smaller mass composition should range from 140 to $300 \times 10^{-2}$ mm and preferably be above $200 \times 10^{-2}$ mm.

For each of the smaller colored masses initially provided according to the invention (but not the first or main mass 14 in the embodiment illustrated in FIG. 1), a pigment is also a constituent of the composition. The color, concentration and chemical identity of these pigments is influenced by the order in which the colored masses of which they are constituents are to be combined with the main mass. The first or earlier colored masses should have pigments which are weak either because they are in a low concentration or because they have a low pigmenting power, such that, when they are combined with the main mass, these pigments will not hide the further addition of stronger pigments. Pigments suitable for use with the invention should be FDA approved, of relatively low cost, and colorfast to ultraviolet light.

Preferably, the pigments are not soluble in any of the lubricants or other lower molecular weight constituents of the composition such as silicone oil or petrolatum. If such lower molecular weight constituents migrate to the surface of the putty, and the pigments are solubilized within them, they will take the dissolved pigments with them. The result would tend to be that the colored pigments would come out of the putty onto the patient's hands. If, on the other hand, the pigment particles are "wetted-out" by the lower molecular weight constituents instead of solubilized in them, the particles will not migrate to the surface of the putty with them.

The pigment concentrations according to the invention are arbitrary but should be low in the first of a series of colored smaller masses and, assuming for a moment that similar coloring ability exists among the pigments, increase in later colored masses. Of course, the more coloring capability a pigment has, the less is needed. Pigment concentrations in each of the colored masses may, for example, range from $1 \times 10^{-5}$ parts by weight per 100 parts of the borosiloxane reaction product to $1 \times 10^{-3}$ parts therein. Pigments found particularly useful for the invention are noted below in parts by weight relative to 100 parts of the borosiloxane reaction product in a preferred series of compositions:

1. Sky blue: 0.0008 parts titanium dioxide and 0.0004 parts ultramarine blue.
2. Yellow: 0.000018 parts chrome yellow.
3. Red: 0.0001 part C1 red 30 aluminum lake pigment.
4. White: 0.0008 parts titanium dioxide.

The present invention is preferably provided in a kit, the parts of which are illustrated in FIG. 1. In FIG. 1, a therapeutic kit 10 according to the invention includes a container 12 of a large or main mass 14 of borosiloxane putty, and a package 16 containing a plurality of pockets containing respective small, colored masses 18–32 of borosiloxane or uncured siloxane putty. The large mass 14 is preferably a borosiloxane-based composition as described above; in its natural state, the mass 14 will have a whitish, translucent appearance. Each of the smaller masses 18–32, however, are highly colored, and at least some of the colored masses 18–32 should have colors which are different from the remaining ones of masses 18–32. For example, mass 18 may be sky blue, mass 20 may be yellow, mass 22 may be red, mass 24 may be yellow again, mass 26 may be green, mass 28 may be a different shade of red, mass 30 may be white, and mass 32 may be dark blue. The sequence and hues of colors within the colored masses 18–32 are largely arbitrary. The choice and concentration of the colors should be chosen accordingly to two guiding principles: first, the beginning colored masses, such as mass 18, should be less highly colored, and the ending colored masses such as mass 32 should be more highly colored. Second, the chosen colors should be sufficiently different from each other such that streaks and the like will be quickly apparent to the physical therapist. At a minimum, the colors should alternate; for example, masses 18, 22, 26 and 30 may be colored blue and masses 20, 24, 28 and 32 white. Other preferably bright colors may be added to the ones chosen for masses 18–32 according to design choice.

The smaller masses 18–32 can all have the same elevated plasticity, $\tau = 210 \times 10^{-2}$ mm. The plasticity of the initial white putty 14 is much lower at $\tau = 106 \times 10^{-2}$ mm. As one of the smaller masses 18–32 is blended with what becomes the combined mass 38, the stiffness (plasticity) of the combined mass increases. The plasticity climbs gradually from a starting point of the initial white putty 14 toward an endpoint of the small masses 18–32. So long as smaller masses of the same size and plasticity are introduced to the combined mass, the plasticity of the combined mass increases in a linear fashion. The linear increase in plasticity is indicative of the increasing difficulty of the putty exercises. The stiffer the putty (combined mass), the more difficult it is to blend any streaks of color that are present. A therapist can provide progressively more difficult exercises to the patient while retaining the ability to visually monitor the completeness of the exercise.

Figure 2A:
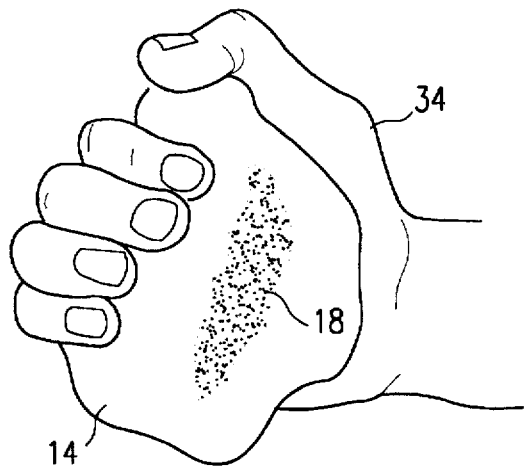
FIGS. 2a–2c are isometric views of exercise putty being manipulated by the hand of a patient, showing progressive stages in the blending of different colors according to the invention.

In FIG. 2a, the initial white putty 14 is shown being manipulated by the patient's hand 34. At this stage, the physician/therapist has just provided the patient with a smaller mass 18 of higher stiffness (plasticity). The patient's exercise is to blend the smaller mass 18 into the initial putty 14 so that a first combined mass 38 is formed.

Figure 2B:
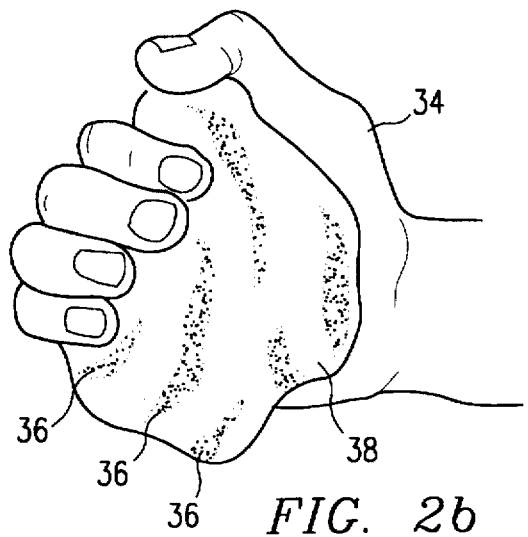

FIG. 2b shows the intermediate blending step as the patient manipulates the first combined mass 38. FIG. 2b shows incomplete manipulation as color streaks 36 are still visible. In addition to showing incomplete color blending, the color streaks 36 are also indicative of non-uniform plasticity within the first combined mass 38.

Figure 2C:
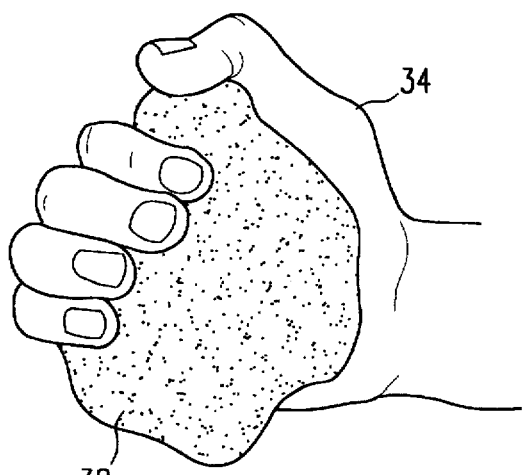

FIG. 2c shows a uniform first combined mass 38 upon completion of the first exercise. Color streaks 36 are no longer visible. The first combined mass 38 should be of uniform color, if the smaller mass 18 was colored, and uniform stiffness. The stiffness of the first combined mass 38 is greater than the stiffness of the beginning mass 14.

The patient may be given further small masses 18–32 from the package 16 and instructed to repeat the process. For example, the first combined mass 38 which is the result of a manipulation process in a first period (such as first day or week) is used (as the initial putty 14 in) to start the second exercise. The patient is instructed to add small mass 20 having a plasticity (stiffness) higher than that of the first combined mass 38. After complete manipulation, the second combined mass will have a stiffness greater than that of the first combined mass 38. The process may be repeated indefinitely with one or more packages 16 of the putty until the stiffness of the combined mass approaches the higher stiffness of the small masses 18–32.

In an additional therapeutic method, the plasticity of the combined mass 38 can be gradually decreased rather than increased over time. A reducing exercise may be appropriate where the patient's hands are being exercised to exhaustion. In order to reduce the plasticity of the combined mass 38, a smaller mass 18–32 with a plasticity lower than that of the combined mass 38 would be used for the manipulation.

In an alternative embodiment, the different colors of the small putty masses 18–22 may be indicative of different plasticities. The amount of the colored putty would be made more nearly equal to the mass of the initial white putty 14 in this embodiment, and the pigment concentration would be commensurately reduced. In this method, the patient would combine a colored putty of relatively low strength or stiffness with the white putty in a first period. In a next period, a portion of the first combined mass may be kneaded and manipulated by the patient with a second colored mass which is stiffer than the first.

EXAMPLES

Example 1

The stiffness was measured as plasticity on a Williams' plastometer. The test method used is described in ASTM D926-89, which is fully incorporated by reference herein. A standard sample size of 2.5 grams was used. The value recorded was the thickness of the material after it had been depressed under a load for three minutes. The higher the value for plasticity, the stiffer the material.

A reaction product was made by reacting 3 parts by weight trimethyl boroxine with 100 parts by weight polydimethyl siloxane with hydroxyl end-groups. The characteristics of the siloxane polymer used are a viscosity of 70 centistokes, a weight average molecular weight of 4,000 and an average of 60 siloxy units per molecule.

The following composition was made:

| | |
|---|---|
| Above reaction product | 100 parts |
| Dimethyl polysiloxane gum | 15 parts |
| Pamolyn oil | 0.2 parts |
| Fumed silica | 8 parts |

The resultant malleable base was used as the large mass of putty (50 grams) into which were added small quantities (10 grams) of higher plasticity putty.

| | Plasticity ($\times 10^{-2}$ mm) |
|---|---|
| First putty mass (a) | 120 |
| Additive mass of putty (b) | 200 |
| After first addition of 10 g. of (b) | 133 |
| After second addition of 10 g. of (b) | 148 |
| After third addition of 10 g. of (b) | 162 |

The data show that each time an additive portion of higher plasticity putty is added, the plasticity of the large mass increases, and thus, the exercise therapy becomes more difficult.

Example 2

The plasticity of a first large mass (100 g.) of putty was measured, and the plasticity of this mass was then successively measured after combination with each of three additive masses of putty, chosen to be 10 g. apiece. The color of the large mass of putty was white. The colors of the three additive masses were pink, yellow and red, respectively. After each addition, the combined mass changed color from white to pink to peach to salmon.

| | Plasticity ($\times 10^{-2}$ mm) | | |
|---|---|---|---|
| | Trial 1 | Trial 2 | $\bar{x}$ |
| First putty mass (a) | 106 | 106 | |
| Additive mass of putty (b) | 210 | 210 | |
| After first addition of 10 g. of (b) | 123 | 115 | 119 |
| After second addition of 10 g. of (b) | 141 | 138 | 140 |
| After third addition of 10 g. of (b) | 154 | 140 | 147 |

The data show an increase in stiffness each time a portion of the additive is added, corresponding to an increase in exercise difficulty.

In summary, a novel exercise putty kit and method for manipulative therapy has been shown and described, in which a patient's progress may be easily observed by a physical therapist or physician and in which a progressively more difficult set of manipulative exercises is provided.

While the detailed description has illustrated and described preferred embodiments, the present invention is not limited thereto but only by the scope and spirit of the appended claims.

I claim:

1. An exercise putty kit for providing manipulative physical therapy of varying difficulty to a patient, comprising:
   a first mass of putty including a reaction product of a polysiloxane and either a boron- or tin-containing compound, the first mass having a first color and stiffness; and
   at least one additional mass of putty comprising (a) a reaction product of a polysiloxane and either a boron- or tin-containing compound, (b) an uncured polydiorganosiloxane gum, or (c) mixtures of (a) and (b), the additional mass having a color and stiffness different from the first mass, the additional mass being combined by the patient with the first mass to form a combined mass having a uniform color and stiffness which is intermediate the stiffnesses of the first mass and the additional mass, such portion of uncured polydiorganosiloxane gum as may be used in said additional mass remaining uncured after the combination of the additional mass with the first mass.

2. The kit of claim 1, wherein the first mass further includes a second uncured polydiorganosiloxane gum.

3. The kit of claim 1, wherein the manipulative physical therapy being provided is of increasing difficulty, and wherein at least two additional masses of putty are provided to the patient, the stiffnesses of the additional masses being greater than the first stiffness.

4. The kit of claim 3, wherein the first mass has a plasticity in the range of 100 to $150 \times 10^{-2}$ mm, the additional masses having a plasticity in the range of 140 to $300 \times 10^{-2}$ mm.

5. The kit of claim 4, wherein first mass has a plasticity of about $105 \times 10^{-2}$ mm.

6. The kit of claim 4, wherein the additional masses have a plasticity of about $200 \times 10^{-2}$ mm.

7. The kit of claim 1, wherein the reaction product comprises borosiloxane.

8. The kit of claim 1, wherein the additional masses comprise a mixture of borosiloxane and uncured polysiloxane gum.

9. The kit of claim 1, wherein the additional masses comprise an uncured polysiloxane gum, a filler and a process aid.

10. The kit of claim 1, wherein the amount of the additional masses relative to the mount of the first mass is in the range of one to twenty percent by weight.

11. The kit of claim 10, wherein the amount of the additional masses relative to the amount of the first mass is about ten percent.

12. An exercise putty kit for providing manipulative physical therapy of increasing difficulty to a patient, comprising:
  a first mass of putty including a reaction product of a polysiloxane and either a boron- or tin-containing compound and further including a second uncured polydiorganosiloxane gum, the first mass having a first stiffness; and
  at least second and third additional masses of putty each comprising (a) a reaction product of a polysiloxane and either a boron- or tin-containing compound, (b) an uncured polydiorganosiloxane gum, or (c) mixtures of (a) and (b), the additional masses of putty each having a stiffness greater than the first stiffness, the second mass adapted to be manually combined by the patient with the first mass to form a first combined mass having a uniform stiffness which is incrementally greater than that of the first mass, the third mass adapted to be manually combined by the patient with the first combined mass to form a second combined mass having a uniform stiffness which is incrementally greater than that of the first combined mass.

13. The kit of claim 12, wherein the additional masses are significantly smaller than the first mass.

14. The kit of claim 12, wherein the first mass comprises:
  100 parts by weight of a chain-extended polysiloxane reaction product formed by reacting a polysiloxane having a viscosity of 30 to 100,000 centistokes with a reactant containing oxygen and either boron or tin;
  10 to 50 parts by weight of an uncured second polysiloxane gum having a plasticity in the range of 120 to $140 \times 10^{-2}$ mm;
  0.2 to 2.0 parts of an internal lubricant; and
  5 to 45 parts by weight of a particulate filler material.

15. The kit of claim 14, wherein the chain-extended polysiloxane reaction product is selected from the group consisting of borosiloxane and stannosiloxane.

16. The kit of claim 15, wherein the reactant is trimethyl boroxine.

17. The kit of claim 15, wherein the reactant is dibutyldiacetoxytin.

18. The kit of claim 14, wherein the polysiloxane of the reaction product has a viscosity of 50 to 70,000 centistokes.

19. The kit of claim 14, wherein the particulate filler material is precipitated silica.

20. A method of manipulative therapy, comprising the steps of:
  supplying to a patient a first malleable mass of putty having a first color and stiffness;
  supplying to the patient a second malleable mass of putty having a color and stiffness different from that of the first mass; and
  directing the patient to combine the second mass with the first mass to form a combined mass having a uniform color and stiffness which is intermediate the stiffnesses of the first and second masses, the uniform color of the combined mass indicating that the patient has manipulated the combined mass by a predetermined amount.

21. The method of claim 20, wherein the first malleable mass is a putty including borosiloxane.

22. The method of claim 20, wherein the second malleable mass is a putty including a polymer selected from the group consisting of a chain-extended polysiloxane reaction product, an uncured polydiorganosiloxane gum and mixtures thereof.

23. The method of claim 20, wherein the second malleable mass is significantly smaller and has a more concentrated color and a stiffness greater than the first malleable mass.

24. The method of claim 20, and further comprising the step of inspecting the combined masses for streaks, the presence of streaks indicating that the combined mass has been manipulated by less than a predetermined amount.

25. The method of claim 20, and further comprising the steps of:
  supplying to the patient a third malleable mass having a color and stiffness different from that of the combined mass; and
  directing the patient to combine the third mass with the combined mass to form a second combined mass having a uniform color and stiffness which is intermediate the stiffnesses of the first combined mass and the third mass, the uniform color of the second combined mass indicating that the patient has manipulated the second combined mass by a predetermined amount.

26. The method of claim 25, wherein pigments of increasing concentration or pigmenting power are added to the second and third malleable masses.

27. The method of claim 20, and further comprising:
  for a predetermined number of iterations greater than three, performing the following steps:
  after a uniform color and stiffness has been achieved in the combined mass, supplying to the patient a further malleable mass having a color and stiffness different from that of the combined mass; and
  directing the patient to combine the further malleable mass with the combined mass until a uniform color and stiffness is again achieved, resulting in a combined mass having a stiffness which is intermediate the stiffnesses of the previous combined mass and the further malleable mass.

28. A method of providing manipulative therapy with progressively increasing difficulty, comprising the steps of:
  supplying to a patient a first malleable mass of putty having a first stiffness;
  supplying to the patient a second malleable mass of putty having a stiffness greater than the first stiffness, the second malleable mass being blendable into the first mass;

directing the patient to combine the second mass with the first mass to form a first combined mass having an increased stiffness which is incrementally greater than that of the first mass;

thereafter supplying to the patient a third malleable mass of putty having a stiffness greater than the first stiffness;

thereafter directing the patient to combine the third mass with the first combined mass to form a second combined mass having a further increased stiffness which is incrementally greater than that of the first combined mass, said sequential steps of forming the first combined mass and forming the second combined mass providing a manipulation therapy to the patient which is progressive in difficulty.

29. The method of claim 28, wherein the first malleable mass is a putty including borosiloxane.

30. The method of claim 28, wherein the second and third malleable masses have about the same stiffness.

31. The method of claim 28, wherein the second and third malleable masses are putties including a polymer selected from the group consisting of a chain-extended polysiloxane reaction product, an uncured polydiorganosiloxane gum and mixtures thereof.

32. The method of claim 28, wherein pigments of increasing concentration or pigmenting power are added to the second and third malleable masses.

33. The method of claim 28, and further comprising:

for a predetermined number of iterations greater than three, performing the following steps:

after a uniform stiffness has been achieved in the combined mass, supplying to the patient a further malleable mass having a stiffness greater than that of the combined mass; and directing the patient to combine the further malleable mass with the combined mass until a uniform stiffness is again achieved, resulting in combined masses of incrementally increasing stiffness.

34. The method of claim 33, wherein pigments of increasing concentration or pigmenting power are added to the further malleable masses.

35. An exercise putty kit for providing manipulative therapy of varying difficulty in a patient, comprising:

a first mass of putty including a reaction product of a polysiloxane and either a boron- or tin-containing compound, the first mass having a first color and stiffness; and at least one additional mass of putty comprising (a) a reaction product of a polysiloxane and either a boron- or tin-containing compound, (b) a first uncured polydiorganosiloxane gum, or (c) mixtures of (a) and (b), the additional mass having a color and stiffness different from the first mass, neither the first mass nor the additional mass containing any catalyst operable to cure the first uncured polydiorganosiloxane gum, the additional mass being combined by the patient with the first mass to form a combined mass having a uniform color and stiffness which is intermediate the stiffnesses of the first mass and the additional mass.

36. An exercise putty kit for providing manipulative therapy of varying difficulty in a patient, comprising:

a first mass of putty including a reaction product of a polysiloxane and either a boron- or tin-containing compound, the first mass having a first color and stiffness; and at least one additional integral mass, of at least one gram weight, of putty comprising (a) a reaction product of a polysiloxane and either a boron- or tin-containing compound, (b) an uncured polydiorganosiloxane gum, or (c) mixtures of (a) and (b), the additional mass having a color and stiffness different from the first mass, the additional mass being combined by the patient with the first mass to form a combined mass having a uniform color and stiffness which is intermediate the stiffnesses of the first mass and the additional mass.

* * * * *